United States Patent
Ferrara et al.

(10) Patent No.: US 10,197,201 B2
(45) Date of Patent: Feb. 5, 2019

(54) SUPPORT BLOCK FOR INTERCHANGEABLE COUPLINGS

(71) Applicant: Faster S.P.A., Rivolta D'Adda (IT)

(72) Inventors: Rocco Ferrara, Rivolta D'Adda (IT); Roberto Sorbi, Rivolta D'Adda (IT); Paolo Rusconi, Rivolta D'Adda (IT)

(73) Assignee: Faster S.P.A., Rivolta D'Adda (IT)

( * ) Notice: Subject to any disclaimer, the term of this patent is extended or adjusted under 35 U.S.C. 154(b) by 44 days.

(21) Appl. No.: 15/383,989

(22) Filed: Dec. 19, 2016

(65) Prior Publication Data
US 2017/0184239 A1 Jun. 29, 2017

(30) Foreign Application Priority Data
Dec. 29, 2015 (EP) ..................................... 15202974

(51) Int. Cl.
| | |
|---|---|
| *F16L 25/14* | (2006.01) |
| *F16L 37/56* | (2006.01) |
| *F16L 37/02* | (2006.01) |
| *F16L 37/40* | (2006.01) |
| *E02F 9/22* | (2006.01) |
| *F16L 37/35* | (2006.01) |
| *F16L 37/42* | (2006.01) |

(52) U.S. Cl.
CPC ............ *F16L 25/14* (2013.01); *E02F 9/2275* (2013.01); *F16L 37/02* (2013.01); *F16L 37/35* (2013.01); *F16L 37/40* (2013.01); *F16L 37/42* (2013.01); *F16L 37/56* (2013.01)

(58) Field of Classification Search
CPC ......... E02F 9/2275; E02F 9/2264; E02F 9/22; F16L 25/14; F16L 37/35; F16L 37/32; F16L 37/42; F16L 37/40; F16L 37/56
USPC .......................... 251/152, 148, 149.9, 149.6
See application file for complete search history.

(56) References Cited

U.S. PATENT DOCUMENTS

| | | | | |
|---|---|---|---|---|
| 2,453,741 A | * | 11/1948 | Bopp ..................... | F16L 37/133 137/269 |
| 2,638,915 A | * | 5/1953 | Mitchell ................ | B60K 25/00 137/322 |
| 3,337,181 A | * | 8/1967 | Wennerstrom .......... | F16L 19/02 251/148 |

(Continued)

FOREIGN PATENT DOCUMENTS

| | | |
|---|---|---|
| DE | 102011013954 | 9/2012 |
| EP | 2378177 | 10/2011 |
| EP | 2054635 | 5/2013 |

OTHER PUBLICATIONS

"Hydraulic Couplings, FF Series, ISO 16028 Flat Face Hydraulic" by M&M Rogness, publicly available since at least Apr. 2013 (http://couplings.mmrogness.com/viewitems/hydraulic-couplings/-couplings-ff-series-iso-16028-flat-face-hydraulic).*

*Primary Examiner* — Reinaldo Sanchez-Medina
*Assistant Examiner* — David Colon Morales
(74) *Attorney, Agent, or Firm* — Stetina Brunda Garred & Brucker

(57) ABSTRACT

A kit includes a support block for quick cartridge couplings suitable for being mounted on a machine and for being hydraulically connected to a hydraulic circuit on said machine. The block of the kit includes one or more seats and is characterized in that it may house cartridges of different types and sizes in said seats in an interchangeable manner. To this end, the kit includes an adapter configured to be inserted into said one or more seats and to house in turn one of said cartridge couplings therein.

15 Claims, 5 Drawing Sheets

(56) References Cited

U.S. PATENT DOCUMENTS

| | | | | |
|---|---|---|---|---|
| 5,060,689 | A * | 10/1991 | Csaszar | F01N 3/30 137/512.15 |
| 5,458,379 | A * | 10/1995 | Hamada | F16L 25/14 285/148.23 |
| 6,036,107 | A * | 3/2000 | Aspen | A01M 7/0089 137/883 |
| 6,116,277 | A * | 9/2000 | Wilcox | F16L 37/23 137/614 |
| 6,161,578 | A * | 12/2000 | Braun | F16L 37/0841 137/614.03 |
| 6,802,492 | B2 * | 10/2004 | Payne | F16L 55/07 251/149.9 |
| 6,840,276 | B2 * | 1/2005 | Zeiber | F16L 29/04 137/614.03 |
| 7,198,060 | B2 * | 4/2007 | Hiser | F16K 27/003 137/495 |
| 7,568,502 | B2 * | 8/2009 | Marquis | F16L 37/32 137/614.04 |
| 8,864,179 | B2 * | 10/2014 | Kitagawa | F16L 37/32 285/124.3 |
| 9,347,594 | B2 * | 5/2016 | Rusconi | F16L 37/56 |
| 2004/0144436 | A1 | 7/2004 | Zeiber et al. | |
| 2005/0103387 | A1 * | 5/2005 | Voege | F16L 37/32 137/614.04 |
| 2007/0145739 | A1 * | 6/2007 | Haberl | F16L 3/16 285/253 |
| 2011/0254265 | A1 * | 10/2011 | Rusconi | F16L 37/32 285/317 |
| 2012/0031515 | A1 | 2/2012 | Whitaker | |

* cited by examiner

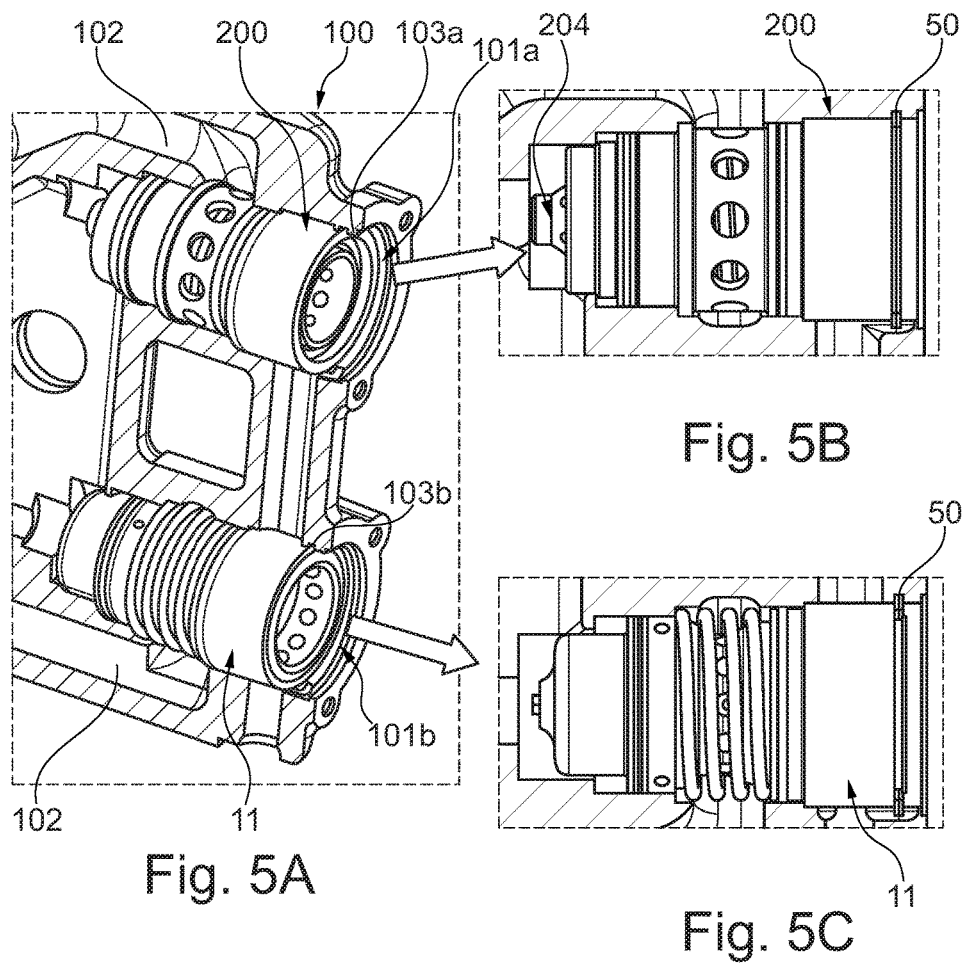
Fig. 5A
Fig. 5B
Fig. 5C
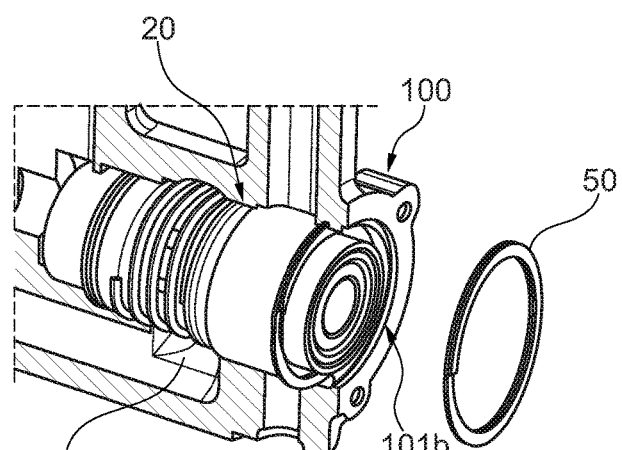
Fig. 6

US 10,197,201 B2

SUPPORT BLOCK FOR INTERCHANGEABLE COUPLINGS

CROSS REFERENCE TO RELATED APPLICATION(S)

The present application claims priority to European Patent Application No. 15202974.0 filed Dec. 29, 2015, the entirety of the disclosures of which are expressly incorporated herein by reference.

STATEMENT RE: FEDERALLY SPONSORED RESEARCH/DEVELOPMENT

Not Applicable.

FIELD OF THE INVENTION

The present invention relates to a kit comprising a support block for quick couplings and an adapter configured for rendering said support block suitable for housing a plurality of types of cartridge couplings having different sizes.

More specifically, the present invention relates to a kit comprising a support block for quick cartridge couplings particularly used in the agricultural field, said adapter being configured for rendering said block capable of housing cartridges of different types and sizes in the same seat in an interchangeable manner.

BACKGROUND ART

It is known from the prior art to make support blocks for quick couplings, known in the field as "manifold", which are mounted on the machine in order to facilitate the simultaneous connection of a plurality of hydraulic lines.

However, the currently known blocks or manifolds do not allow different types of cartridge couplings to be used.

Similarly, within the same type of cartridges, the currently known blocks do not allow different types of cartridges to be inserted.

It is thus apparent that an intrinsic limitation of the currently known blocks exists, which are not at all versatile, as they are to be wholly replaced and substituted by a different block should different utilities having hydraulic lines associated with different types and/or sizes of cartridges be connected to the machine, precisely by means of the block or manifold.

The term "size" used herein is commonly used in the field to indicate the size of the couplings, and reference to such a size is made in inches, the sizes of the couplings being standardized in the field. They may be half-inch (½") couplings, i.e. having a diameter of 12.5 mm, three-quarter-inch (¾"), i.e. 20.0 mm, five-eighths-inch (⅝"), i.e. 10.0 mm, for example.

Quick couplings of the cartridge type of the present invention are so called because they need to be integrated in the seat of an outer block supporting them for the functionality thereof. The oil flow occurs in a non-axial manner with respect to the cartridge itself, thus also involving the manifold or block itself, as known from the prior art.

SUMMARY OF THE INVENTION

Therefore, it is the task of the present invention to provide a kit comprising a support block or manifold which is more versatile than the systems of known type, overcoming the incompatibility limitations with cartridges of various types and various sizes afflicting the systems of known type.

Within the scope of this task, it is the object of the present invention to provide a kit comprising a support block or manifold capable of operating with various types of cartridge couplings.

It is also the object of the present invention to provide a kit comprising a support block or manifold capable of operating with cartridges of different sizes of the same type of cartridge.

This task and these and other objects which will become more apparent hereinafter, are achieved by a kit comprising a support block for cartridge couplings suitable for being mounted on a machine and for being hydraulically connected to a hydraulic circuit on said machine, said block comprising at least one seat configured to house a cartridge and at least one channel for the fluid-dynamic connection of said seat with the hydraulic circuit of said machine, said kit further comprising at least one adapter configured to be inserted into said seat and to house in turn a cartridge coupling, as claimed in the appended claims, which form an integral part of the present description.

In view of the above, according to an embodiment of the present invention, there is provided a kit comprising a support block for cartridge couplings, suitable for being mounted on a machine and for being hydraulically connected to a hydraulic circuit on said machine, said block comprising at least one seat configured to house a cartridge, said kit further comprising at least one adapter configured to be inserted into said seat and to house in turn one of said cartridge couplings therein.

According to an embodiment, said adapter comprises a cylindrical body provided with one or more radial holes for the operating fluid, in particular oil, to pass inside the cartridge coupling when it is inserted therein.

According to an embodiment, said adapter comprises an open front end in which the coupling is inserted, and a rear end.

According to an embodiment, said cartridge coupling comprises a decompression valve and said adapter further comprises, at the rear end thereof, a pusher which is movable with respect to the cylindrical body of said adapter so as to allow said decompression valve to be actuated.

According to an embodiment, said cartridge couplings comprise half-inch cartridge couplings, three-quarter-inch cartridge couplings, half-inch flat-face cartridges and five-eighths-inch flat-face cartridges.

According to an embodiment, at least one of said seats is sized to house three-quarter-inch cartridge couplings.

According to an embodiment, said adapter is configured to be inserted into said at least one three-quarter-inch seat.

According to an embodiment, said adapter is configured to house a half-inch cartridge coupling.

According to an embodiment, said kit further comprises, on said block and inside at least one of said seats, a seat and at least a first retaining device adapted to be inserted into said seat to stably retain said adapter inside said seat.

According to an embodiment, said retaining device consists of a retaining ring and said seat consists of a circumferential groove obtained close to the front opening of said seat.

According to an embodiment, said at least one of said seats is configured to house flat face cartridge couplings.

Further embodiments are defined by the appended claims.

BRIEF DESCRIPTION OF THE DRAWINGS

Further features and advantages of the present invention will become more apparent from the following detailed description, provided by way of non-limiting example and illustrated in the accompanying drawings, in which:

FIG. 5A shows a partially sectional perspective view of the kit according to the present invention, in which the block or manifold and an adapter inserted into a first seat obtained on said block are shown, said adapter comprising in turn a cartridge; a second seat is occupied by a different type of cartridge with respect to the first, without adapter;

FIG. 5B shows an enlargement of the adapter according to the present invention, comprising a cartridge and inserted into the first seat of the support block in FIG. 5A;

FIG. 5C shows an enlargement of a cartridge inserted into the second seat of the support block in FIG. 5A;

FIG. 6 shows a different type of cartridge inserted into the second seat of the support block;

DETAILED DESCRIPTION OF THE INVENTION

The following description will disclose a preferred embodiment of the kit according to the present invention. Such a description is provided by way of non-limiting example, thus all variants of the described elements which may be considered equivalent are to be considered as falling within the scope of the present invention.

Figure 1:
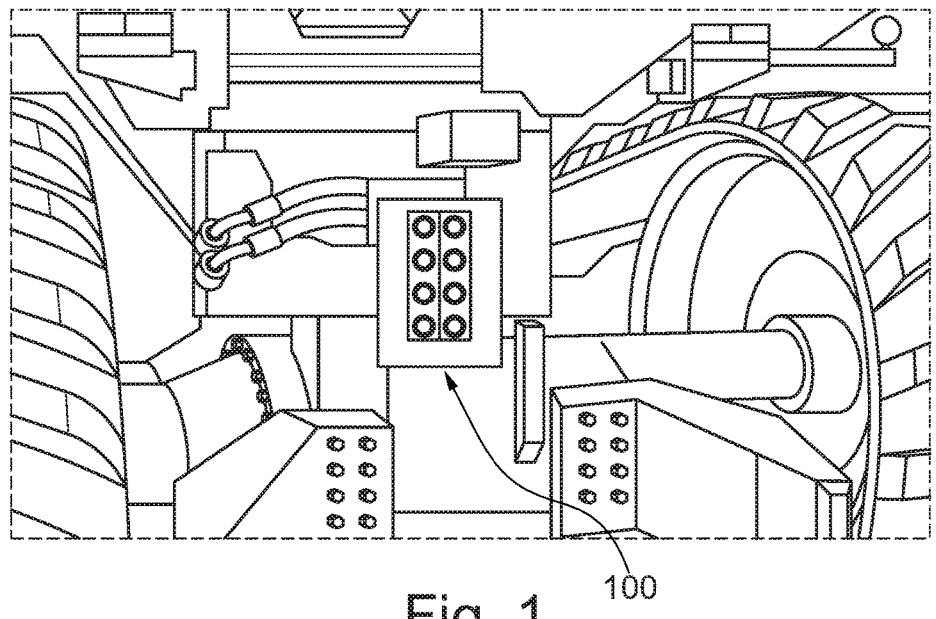
FIG. 1 shows an example of positioning a block or manifold on a machine, in particular an agricultural machine.

In FIG. 1 there is depicted a support block according to an embodiment of the present invention fixed to the rear of an agricultural machine (tractor).

Figure 2:
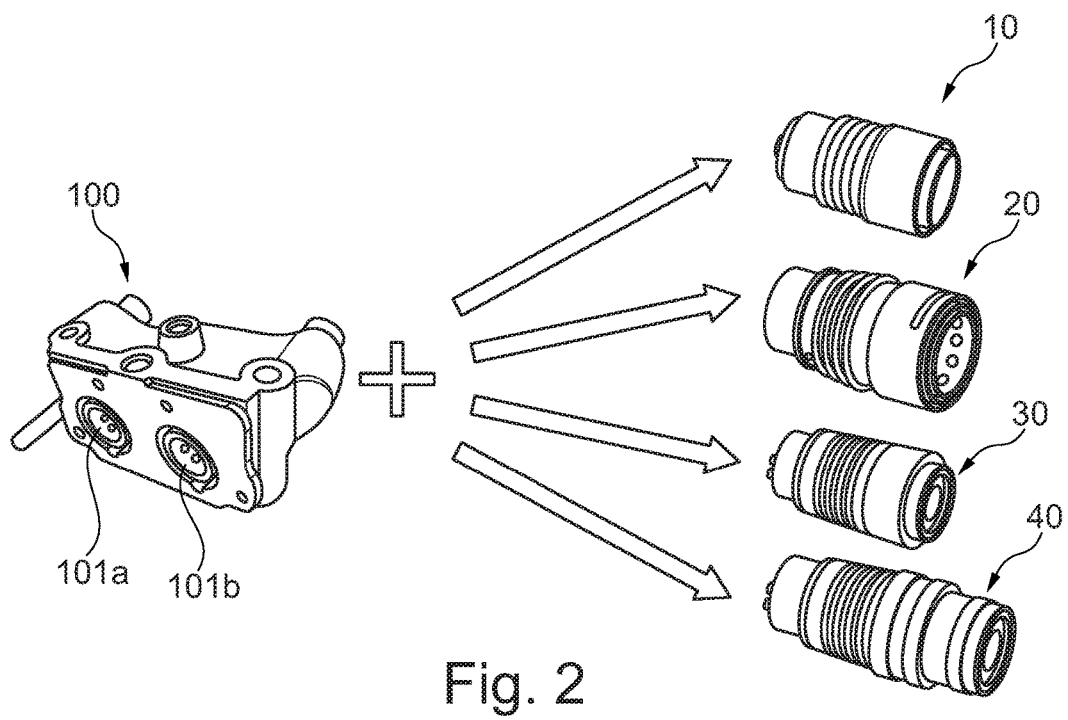
FIG. 2 shows different types and different sizes of cartridges by way of example.

With particular reference to FIG. 2, a support block 100 of the type considered herein generally consists of a block made of cast iron or similar metal material, and is provided with at least one seat 101a, 101b therein, configured to house a cartridge coupling.

Various types of cartridge couplings are known on the market such as the half-inch (½") cartridges used in the agricultural field, again shown in FIG. 2 and identified with numeral 10, and/or cartridges of the same type for the agricultural field but larger in size, like three-quarter-inch (¾") cartridges, identified with numeral 20, half-inch (½") flat-face cartridges, identified by numeral 30, and five-eighths-inch (⅝") flat-face cartridges, identified by numeral 40.

Half-inch 10 and three-quarter-inch 20 cartridges for agricultural applications are suitable for being connected to standard ISO 7421-compliant males, while half-inch 30 and five-eighths-inch 40 flat-face cartridges are suitable for being connected to a standard ISO 16028-compliant male.

Figure 3:
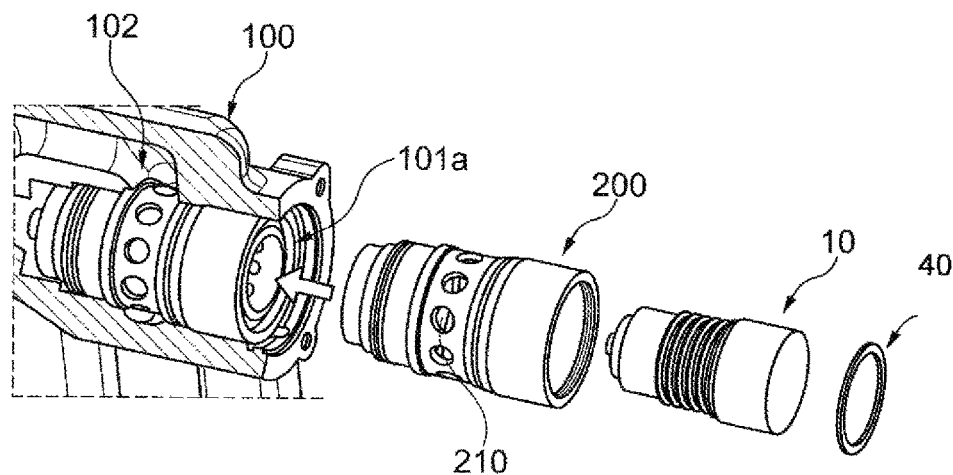
FIG. 3 shows an exploded view of the kit according to the present invention; in particular, the seat obtained on the block and an adapter can be seen.

With reference to FIG. 3, a preferred embodiment of the kit according to the present invention is depicted.

Such a kit comprises a support block 100 for cartridge couplings 10, 20, 30 and 40, (a cartridge 10 being depicted by way of example) suitable for being mounted on a machine (FIG. 1) and for being hydraulically connected to a hydraulic circuit on said machine.

To this end, said support block 100 comprises at least one seat 101a, 101b (seat 101a depicted in FIG. 3) open at the front and configured to house one of the cartridges 10, 20, 30, 40, and at least one channel 102 for the fluid-dynamic connection of said seat 101a, 101b with the hydraulic circuit of said machine.

The kit further comprises at least one adapter 200 configured to be inserted into said seat 101 and to house in turn one of the cartridge couplings 10, 20.

The kit further comprises at least a first retaining device 40, consisting for example of a first retaining ring, adapted to be inserted into a seat, in particular a circumferential groove 41, specifically provided on the inner surface of said adapter 200.

Figure 4:
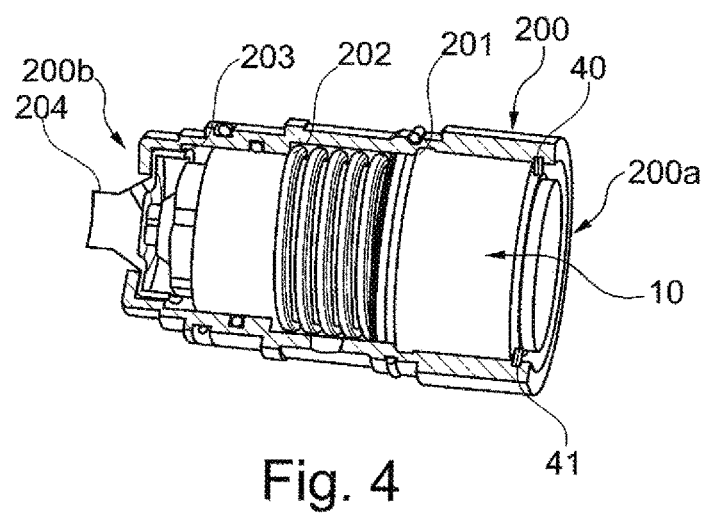
FIG. 4 shows a partially sectional view of a cartridge inserted into the adapter in FIG. 3.

The assembled configuration of a cartridge, in particular of a half-inch agricultural cartridge 10, inserted into adapter 200 is depicted in FIG. 4.

Cartridge 10 is inserted into adapter 200, which has a groove 41 for the first retaining ring 40. The adapter is like a hollow cylindrical body, the inner cavity of which has one or more diameter constrictions 201, 202, 203, which form just as many abutments for the cartridge 10 which is (to be) inserted therein.

A front end 200a in which the coupling is inserted and a rear end 200b may therefore be easily identified on the cylindrical body of adapter 200. Advantageously, provided at the rear end 200b of the adapter is a pusher 204, preferably cup-shaped, movable with respect to the cylindrical body of the adapter 200 and which may be moved so as to actuate the decompression valve 10a of a coupling 10 once housed in the adapter 200, substantially in the same way in which the decompression valve of couplings of larger diameter, once housed in the seat 101a, 101b of the block 100, is actuated.

The seat obtained on block 100 allows the interchangeability between different sizes of cartridges, in particular of those of the so-called agricultural series.

In accordance with a preferred embodiment of the present invention shown in the accompanying drawings, the seat is preferably sized so as to match with three-quarter-inch cartridge couplings (¾") 20 of the type used in the agricultural field, and also allows half-inch (½") cartridges (for instance of the flat-face type (indicated with numeral 10) to be accommodated in block 100 by using adapter 200, forming part of the present invention as well.

The special adapter 200 is in fact externally configured to be accommodated in the three-quarter-inch (¾") seat, and is internally configured to allow a half-inch cartridge coupling 10 to be accommodated.

Adapter 200 has a series of radial holes 205 for the purpose of allowing the operating fluid, in particular oil, to pass inside the cartridge coupling accommodated therein.

Three-quarter-inch 10, 20 and half-inch 30, 40 cartridge couplings have different strokes when connected and disconnected.

Such stroke differences are compensated for by the cup-shaped pusher 204.

In addition to serving the function of compensating for the difference in length between the couplings of the two sizes, such a pusher 204 allows the cartridge coupling to operate properly, thus allowing the decompression and passage of the oil through a series of radial holes 205 (FIG. 8) thereon and which allow the oil to pass.

Figure 8:
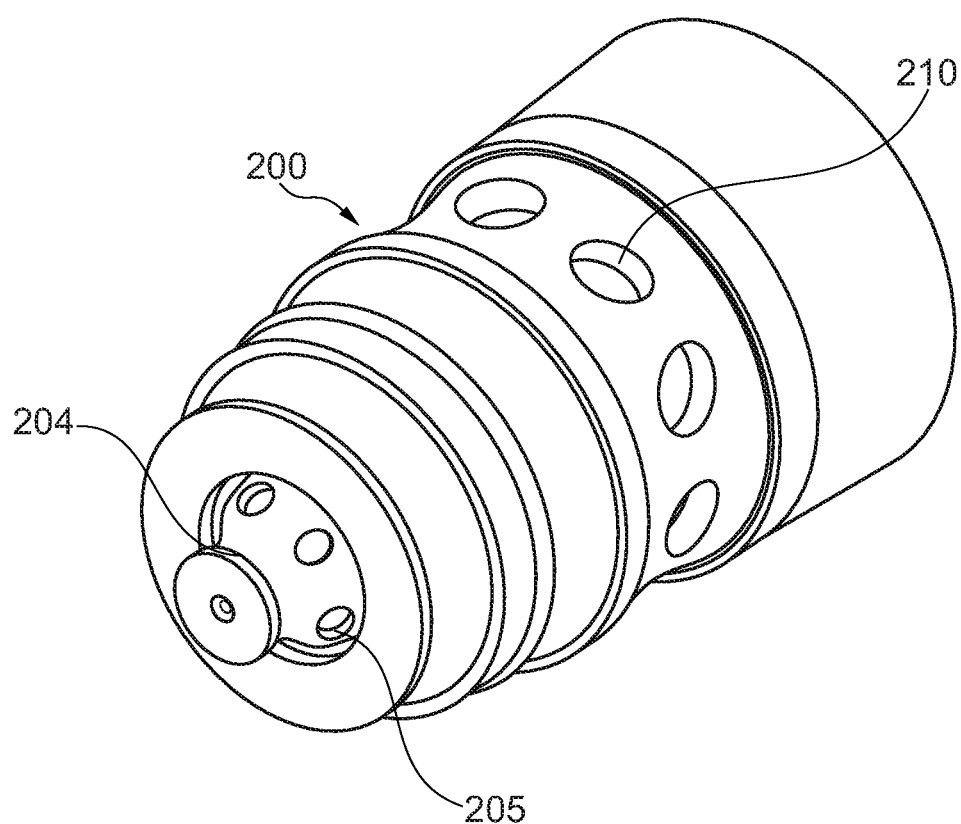
FIG. 8 shows a perspective view of the adapter according to the present invention.

With particular reference to FIG. 8, adapter 200 further comprises a plurality of radial openings 210 arranged circumferentially along the outer cylindrical surface.

Said openings preferably consist of radial holes 210. Said radial holes 210 allow the fluid to pass in radial direction and put the cartridge 10 inserted into adapter 200 in fluid communication with the channels 102, which put the seat 101a, 101b of block 100 in fluid communication with the hydraulic circuit of the machine (not depicted in the drawings).

With particular reference to FIGS. 5A, 5B and 5C, cartridges of different types and of different sizes may be simultaneously accommodated in a block 100 according to the present invention, thus achieving the object to be resolved by the invention.

More specifically, FIG. 5A shows a block 100 according to the present invention, comprising two seats for accommodating just as many cartridges, a first seat 101a and a second seat 101b.

Both seats 101a, 101b are advantageously (by way of not limiting example) sized to house larger diameter cartridges.

Such seats are preferably both sized to house three-quarter-inch (¾") cartridges 20.

FIGS. 5A, 5B and 5C show a three-quarter-inch (¾") cartridge 20 of the type used in the agricultural field, directly inserted into said second seat 101b.

A circumferential groove 103b configured to house a second retaining ring 50 capable of stably retaining cartridge 20 inside the seat is conveniently provided on said second seat 101b.

A circumferential groove 103a configured to house a similar second retaining ring 50 capable of stably retaining adapter 200 inside seat 101a is also conveniently provided on the inner surface of the first seat 101a.

FIG. 5B particularly shows a cartridge 10, again of the type used in the agricultural field, but smaller, in particular a half-inch (½") cartridge, for example. Here, the smaller diameter cartridge is accommodated in seat 101a by means of adapter 200.

The insertion of the cartridge into the adapter is shown in FIG. 4, a first retaining ring 40 stably holds cartridge 11 inside adapter 200, a housing groove 41 being conveniently provided inside the adapter.

With reference again to FIG. 5B, a second retaining ring 50 holds adapter 200 inside the first seat 101a when adapter 200 is inserted into the seat 101a of block 100.

Referring now to FIGS. 6, 7A, 7B and 7C, flat face cartridges, i.e. of different type with respect to those of the type used in the agricultural field considered in the above examples, may be used with the support block 100 according to the present invention.

FIG. 6 shows a half-inch flat-face cartridge 20 inserted into a seat 101b of block 100. As shown above, a retaining ring 50 keeps the cartridge stably inserted into seat 101b also in this case.

Figure 7B:
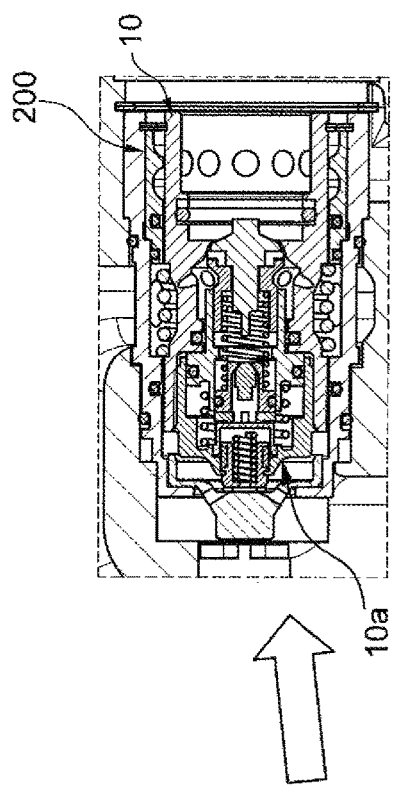
FIG. 7B shows a section of the adapter according to the present invention, comprising a cartridge and inserted into the first seat of the support block in FIG. 7A.
Figure 7C:
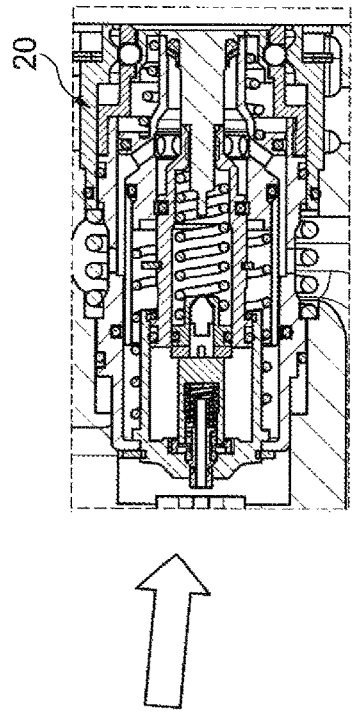
FIG. 7C shows an enlargement of a cartridge inserted into the second seat of the support block.
Figure 7A:
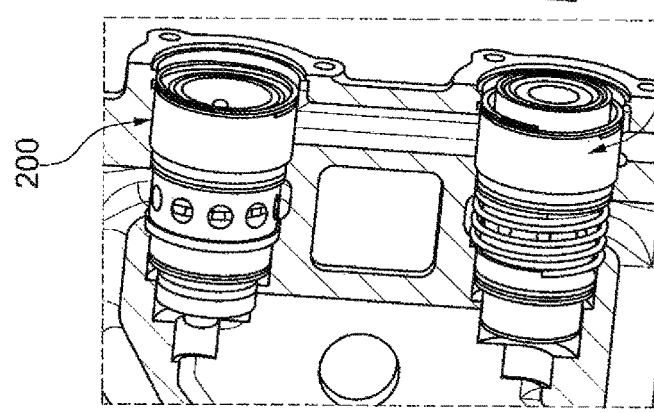
FIG. 7A shows a partially sectional perspective view of the kit according to the present invention, in which the block or manifold and an adapter inserted into a first seat obtained on said block are shown, said adapter comprising in turn a cartridge; a second seat is occupied by a different type of cartridge with respect to the first, without adapter.

In particular, FIGS. 7A and 7C show how half-inch (½") flat-face cartridges 10 may be directly inserted into one of the seats 101a, 101b of the block without the need to use any adapter.

The invention claimed is:

1. A kit, comprising:
a support block for cartridge couplings, said support block configured to mount on a machine and to be hydraulically connected to a hydraulic circuit on said machine, said support block comprising at least one seat configured to house a first cartridge coupling of a first size among a plurality of cartridge couplings, said kit further comprising at least one adapter configured to be inserted into said at least one seat and to house a second cartridge coupling among said plurality of cartridge couplings, said second cartridge coupling having a size less than that of said first cartridge coupling, wherein said adapter comprises a cylindrical body provided with one or more radial holes for operating fluid to pass inside said second cartridge coupling when the second cartridge coupling is inserted in the adapter.

2. The kit according to claim 1, wherein said adapter comprises an open front end through which said second coupling may be inserted, and a rear end opposite to said front end.

3. The kit according to claim 2, wherein said adapter further comprises, at the rear end thereof a pusher which is movable with respect to the cylindrical body of said adapter so as to allow a decompression valve of a cartridge coupling to be actuated.

4. The kit according to claim 1, wherein said at least one seat is configured to house three-quarter-inch cartridge couplings, and said at least one adapter is configured to house either half-inch cartridge couplings or five-eighths-inch flat-face cartridges.

5. The kit according to claim 2, wherein said at least one seat is configured to house three-quarter-inch cartridge couplings, and said at least one adapter is configured to house either half-inch cartridge couplings or five-eighths-inch flat-face cartridges.

6. The kit according to claim 3, wherein said at least one seat is configured to house three-quarter-inch cartridge couplings, and said at least one adapter is configured to house either half-inch cartridge couplings or five-eighths-inch flat-face cartridges.

7. The kit according to claim 1, wherein said support block further comprises a second seat sized to house either half inch or five-eights-inch cartridge couplings.

8. The kit according to claim 4, wherein said support block further comprises a second seat sized to house either half inch or five-eights-inch cartridge couplings.

9. The kit according to claim 4, wherein said kit further comprises a second adapter configured to be inserted into said second seat.

10. The kit according to claim 9, wherein said second adapter is configured to house a half-inch cartridge coupling.

11. The kit according to claim 1, wherein at least one of said at least one seat and a second seat comprises a circumferential groove and wherein said kit comprises at least a first retaining device adapted to be inserted into said circumferential groove to stably retain said adapter inside said at least one seat or said second seat.

12. The kit according to claim 4, wherein at least one of said at least one seat and a second seat comprises a circumferential groove and wherein said kit comprises at least a first retaining device adapted to be inserted into said circumferential groove to stably retain said adapter inside said at least one seat or said second seat.

13. The kit according to claim 7, wherein at least one of said at least one seat and said second seat comprises a circumferential groove and wherein said kit comprises at least a first retaining device adapted to be inserted into said circumferential groove to stably retain said adapter inside said at least one seat or said second seat.

14. The kit according to claim 10, wherein a retaining device consists of a retaining ring and a circumferential groove is located close to the front end of said second seat.

15. The kit according to claim 1, wherein said at least one seat is configured to house flat face cartridge couplings.

* * * * *